US012763529B2

(12) United States Patent
Bandiwad et al.

(10) Patent No.: US 12,763,529 B2
(45) Date of Patent: Oct. 13, 2026

(54) COMPACT END OF LINE BRACKET AND CAP

(71) Applicant: WHIRLPOOL CORPORATION, Benton Harbor, MI (US)

(72) Inventors: Lingaraj Bandiwad, Savanur Taluk (IN); Omkar Bharat Jadhav, Maharashtra (IN); Murgyappa Athani, Maharashtra (IN); Wojciech Pawłowski, Wroclaw (PL)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 465 days.

(21) Appl. No.: 18/448,445

(22) Filed: Aug. 11, 2023

(65) Prior Publication Data

US 2025/0055237 A1 Feb. 13, 2025

(51) Int. Cl.
*H01R 24/76* (2011.01)
*H01R 13/506* (2006.01)
*H01R 13/74* (2006.01)

(52) U.S. Cl.
CPC ......... *H01R 13/743* (2013.01); *H01R 13/506* (2013.01); *H01R 24/76* (2013.01)

(58) Field of Classification Search
CPC .. H01R 13/506; H01R 13/743; H01R 13/745; H01R 24/76
See application file for complete search history.

(56) References Cited

U.S. PATENT DOCUMENTS 4,117,310 A 9/1978 Clark
6,200,155 B1 * 3/2001 Chudkosky ............ H01R 31/06 174/53
6,347,955 B1 * 2/2002 Huang ................ H01R 13/629 439/378
6,364,699 B1 * 4/2002 Hwang ............. H01R 13/6485 439/352
6,659,796 B1 * 12/2003 Waddell ............... H01R 13/745 439/352
7,601,913 B2 * 10/2009 Kim ...................... F25D 23/064 174/72 A (Continued)

FOREIGN PATENT DOCUMENTS

EP 2371035 B1 4/2018
WO WO-2010076144 A1 * 7/2010 .............. F24C 7/085

OTHER PUBLICATIONS

Jameco Electronics, "Molex Product Specification Micro-Fit Duel Row Connectors", Apr. 21, 2003, 8 pages.

*Primary Examiner* — Abdullah A Riyami
*Assistant Examiner* — Thang H Nguyen
(74) *Attorney, Agent, or Firm* — BROOKS KUSHMAN P.C.

(57) ABSTRACT

An EOL bracket assembly for an appliance includes an EOL plug configured to hold a plurality of wires for attachment to an external power source; an EOL bracket having a through aperture, an interior detent defined within the aperture for receiving and retaining the EOL plug, and flexible latches for securing the EOL bracket into a through hole of a panel of the appliance; and an EOL cap defining a cap body sized to cover the EOL bracket when installed into the panel, the EOL cap defining locking snaps for securing the EOL cap into cutouts of the through hole around the EOL bracket.

18 Claims, 5 Drawing Sheets

(56) References Cited

U.S. PATENT DOCUMENTS

| | | | | |
|---|---|---|---|---|
| 11,460,195 | B2 * | 10/2022 | Bruin-Slot | F24C 15/164 |
| 2007/0128938 | A1 * | 6/2007 | Kuo | H01R 13/745 439/607.41 |
| 2025/0047027 | A1 * | 2/2025 | Brandt | H01R 13/428 |

* cited by examiner

COMPACT END OF LINE BRACKET AND CAP

TECHNICAL FIELD

Aspects of the disclosure relate to appliances, and more particularly, to ovens that have a compact end-of-line (EOL) bracket and cap.

BACKGROUND

Some ovens include plugs that require substantial space on the chassis for an emboss and plastic cover. However, these plugs require space that may be better used for air louvers to provide thermal management to the oven. Moreover, those designs may require specific tools and multiple steps to install the EOL plug into the chassis.

SUMMARY

In one or more embodiments, an end-of-line (EOL) bracket assembly for an appliance includes an EOL bracket forming a generally hollow prism shape, the EOL bracket comprising an EOL body defining a through aperture from an interior end of the EOL body to an exterior end of the EOL body; and an EOL plug configured to hold a plurality of wires for attachment to an external power source, wherein the EOL body defines flexible latches for securing the EOL bracket when the interior end is inserted into a through hole of a panel of the appliance, and further defines an interior detent for receiving and retaining the EOL plug when inserted into the interior end of the EOL body.

In one or more embodiments, an EOL bracket assembly for an appliance includes an EOL plug configured to hold a plurality of wires for attachment to an external power source; an EOL bracket having a through aperture, an interior detent defined within the aperture for receiving and retaining the EOL plug, and flexible latches for securing the EOL bracket into a through hole of a panel of the appliance; and an EOL cap defining a cap body sized to cover the EOL bracket when installed into the panel, the EOL cap defining locking snaps for securing the EOL cap into cutouts of the through hole around the EOL bracket.

In one or more embodiments, a method for assembling EOL bracket assembly for an appliance includes inserting an EOL bracket having a through aperture into a through hole of a panel of an appliance from an exterior side of the panel; inserting an EOL plug into an interior end of the through aperture to secure the EOL plug into the EOL bracket; and snapping an EOL cap into the through hole of the panel from the exterior side, over the EOL bracket and the EOL plug as assembled to the panel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is an improved compact EOL bracket assembly. The compact EOL bracket assembly includes an EOL bracket, an EOL plug, and an EOL cover. The EOL bracket, EOL cap, and EOL plug may be assembled and mounted to the oven without tools or screws. In an example, the EOL plug may be snapped into the EOL bracket, and then the EOL bracket may be snapped into the cutout. Once installed, the EOL cap may be snapped in place over the installed EOL bracket. This provides the advantage that the EOL bracket, EOL cap, and EOL plug can all be assembled and mounted to the oven without tools or screws. Moreover, the compact side of the assembly allows more space for air louvers which result in better thermal performance and heat dissipation.

The EOL bracket assembly may be mounted into an EOL assembly mount cutout defined by an exterior wall of the oven. The cutout may be a through hole in the side chassis of the oven, for example. The cutout may be flush with the panel, thereby avoiding an emboss into the oven chassis.

The EOL bracket may define flexible body latches along its length to allow the EOL bracket to be fixed into the cutout. The EOL bracket may further define a through aperture for receiving and securing the EOL plug. For example, the EOL plug may define mount cars and stop walls that secure the EOL plug around an interior detent defined by the through aperture of the EOL bracket. Thus, the EOL bracket may both receive the EOL plug and also snap into the cutout.

The EOL cap may define locking snaps along its width to snap into the cutout around the EOL bracket. Thus, the EOL cap may be snapped on top of the exterior of the EOL bracket while the EOL bracket is holding the EOL plug in place. Further aspects of the compact EOL bracket assembly discussed in detail herein.

Figure 1:
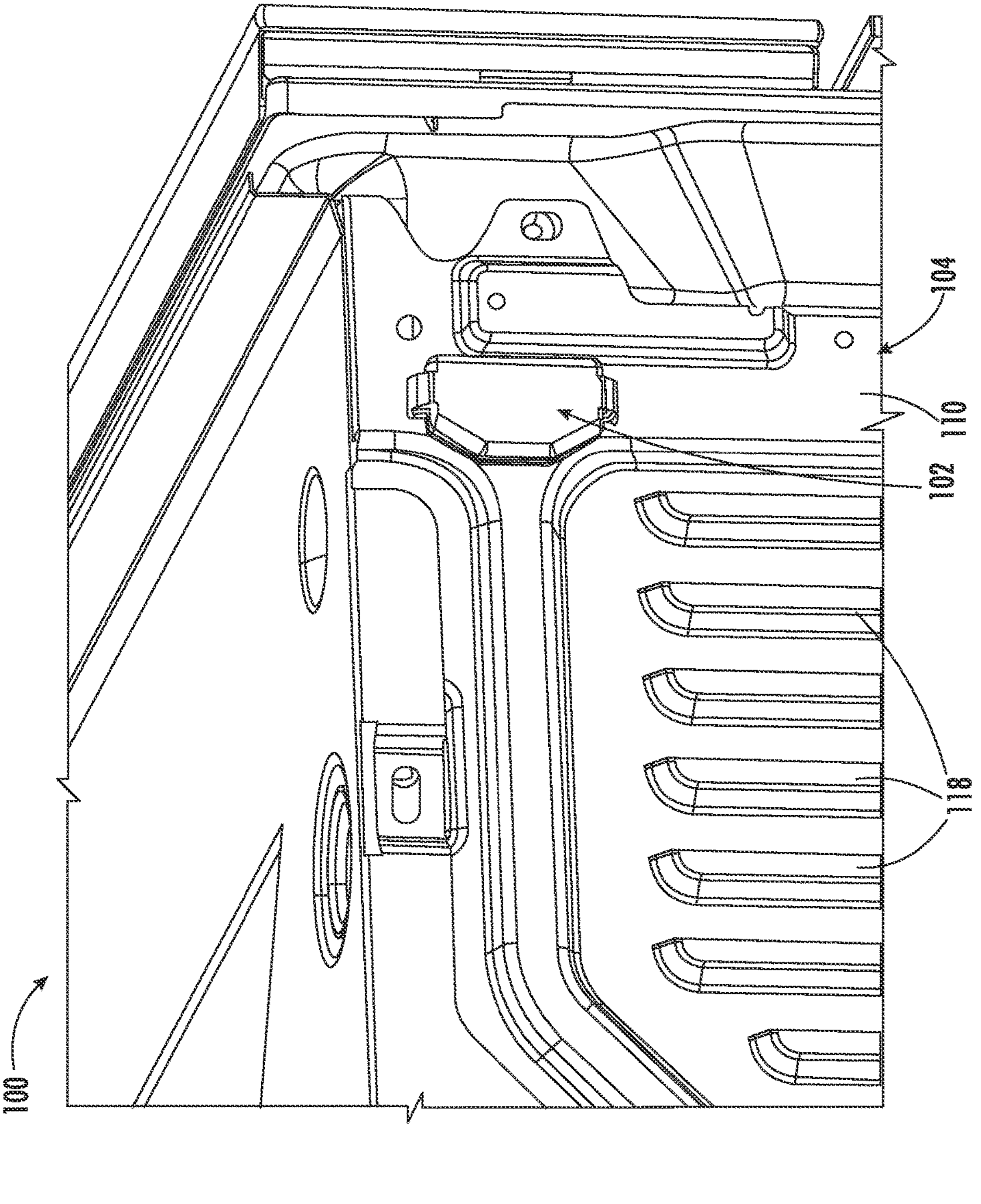
FIG. 1 illustrates a perspective side view of an oven having a compact EOL bracket assembly for attachment to a side panel of the oven.

FIG. 1 illustrates an example side perspective view of an oven 100 having a compact EOL bracket assembly 102 for attachment to a side panel 104 of the oven 100. The compact EOL bracket assembly 102 includes an EOL bracket 106 configured to receive and hold an EOL plug 108. When installed to the side panel 104, the EOL bracket 106 may be configured to receive a selectively attachable EOL cap 114.

The oven 100 may be of various types, such as a conventional oven, a microwave oven, or a combination microwave oven. The compact EOL bracket assembly 102 may therefore be utilized in various types of ovens 100. The compact EOL bracket assembly 102 may also be used in other types of appliances having wiring requirements, such as built-in refrigerators, dishwashers, and laundry washers or dryers.

Figure 2:
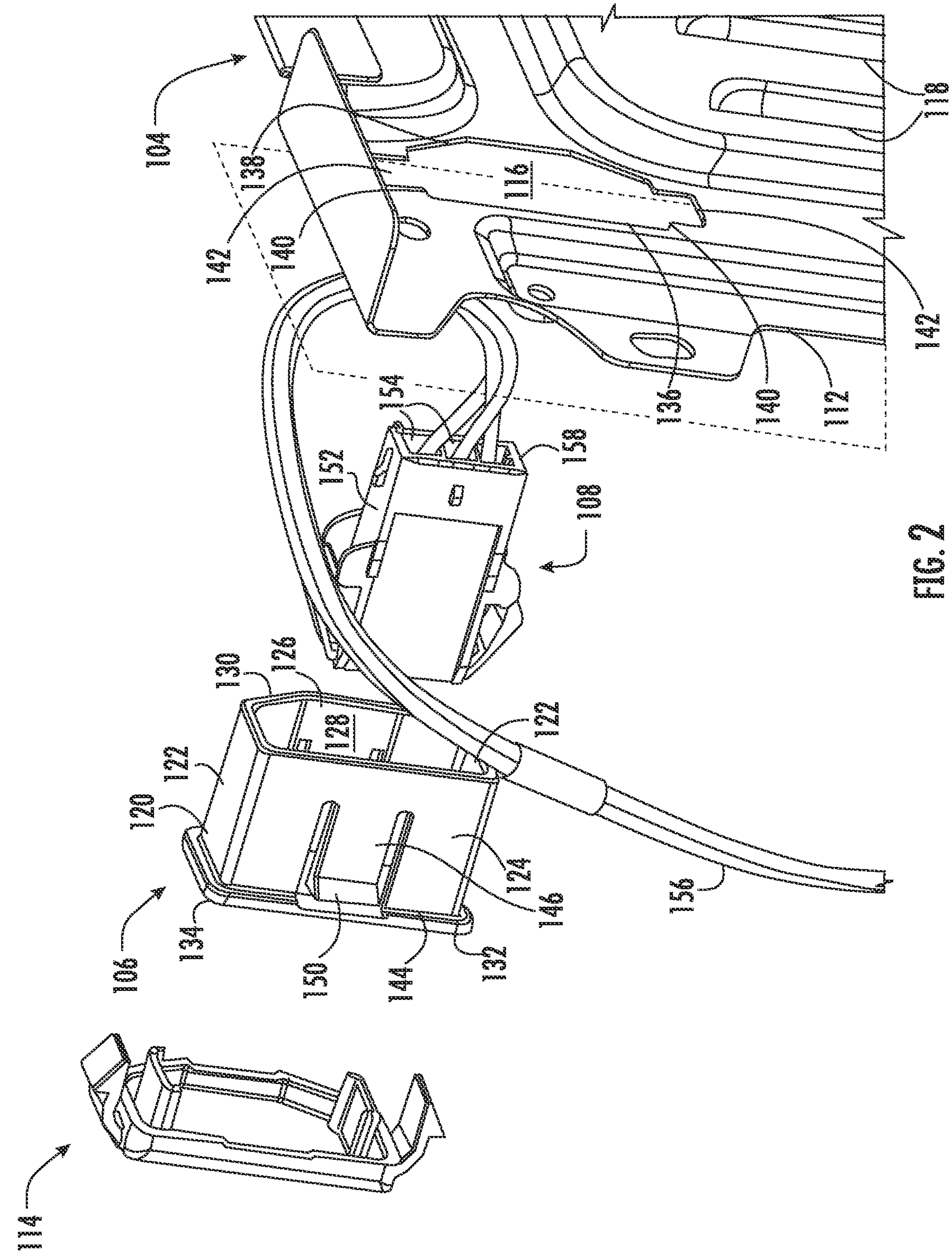
FIG. 2 illustrates an exploded perspective view of the EOL bracket, the EOL plug, the EOL cap, and the side panel of the oven.

As best seen in FIG. 2, the side panel 104 may have an outer face 110 defining an outer surface of the oven 100, and an inner face 112 inside the oven 100, opposite the outer face 110. The side panel 104 may define a through hole 116, through the faces 110, 112, which is sized and shaped for receiving the compact EOL bracket assembly 102. In many examples, the side panel 104 may be formed of a metal sheet, such as by stamping. The through hole 116 may accordingly be stamped or punched into the surface of the side panel 104 to provide the opening for insertion of the compact EOL bracket assembly 102. As shown, the through hole 116 may be positioned on a flat region of the side panel 104, spaced apart from the air louvers 118 or other features of the side panel 104.

The EOL bracket 106 may have a EOL body 120 defining a generally hollow prism shape. As shown, the shape is a generally a rectangular prism with two parallel short sides 122, a first long side 124, and a second asymmetric long side 126. As shown, the asymmetric long side 126 includes three faces, such that the sides 122, 124, 126 of the EOL body 120 collectively define a hexagonal prism having a through aperture 128 open from an interior end 130 of the EOL body 120 through an exterior end 132 of the EOL body 120.

The sides 122, 124, 126 of the EOL body 120 extend from an interior end 130 of the EOL body 120 to an exterior end 132. The interior end 130 may be suitable for insertion into the through hole 116 from the outside of the oven 100. The exterior end 132 may define a body flange 134 extending outwards from the exterior end 132 the prism shape, such that when the EOL body 120 is inserted into the through hole 116, an inner flange face 144 of the body flange 134 mates with the outer face 110 of the side panel 104, preventing the EOL body 120 from falling inside the oven 100 when inserted.

The through hole 116 defines a corresponding shape to the exterior contour of the EOL body 120. The through hole 116 may be defined by a first long edge 136 shaped to conform with the shape of the long side 124, a second long edge 138 shaped to conform to the semi-hexagon contour of the asymmetric long side 126, and short side edges 140 conforming to the contour of the parallel short sides 122. Because the EOL body 120 is asymmetrical (in other words, polarized), the EOL body 120 may be insertable into the through hole 116 only in a single orientation. Moreover, the through hole 116 also includes cover gaps 142 extending outwards from the short side edges 140 for receiving the EOL cap 114, which is discussed in detail later.

Figure 3A:
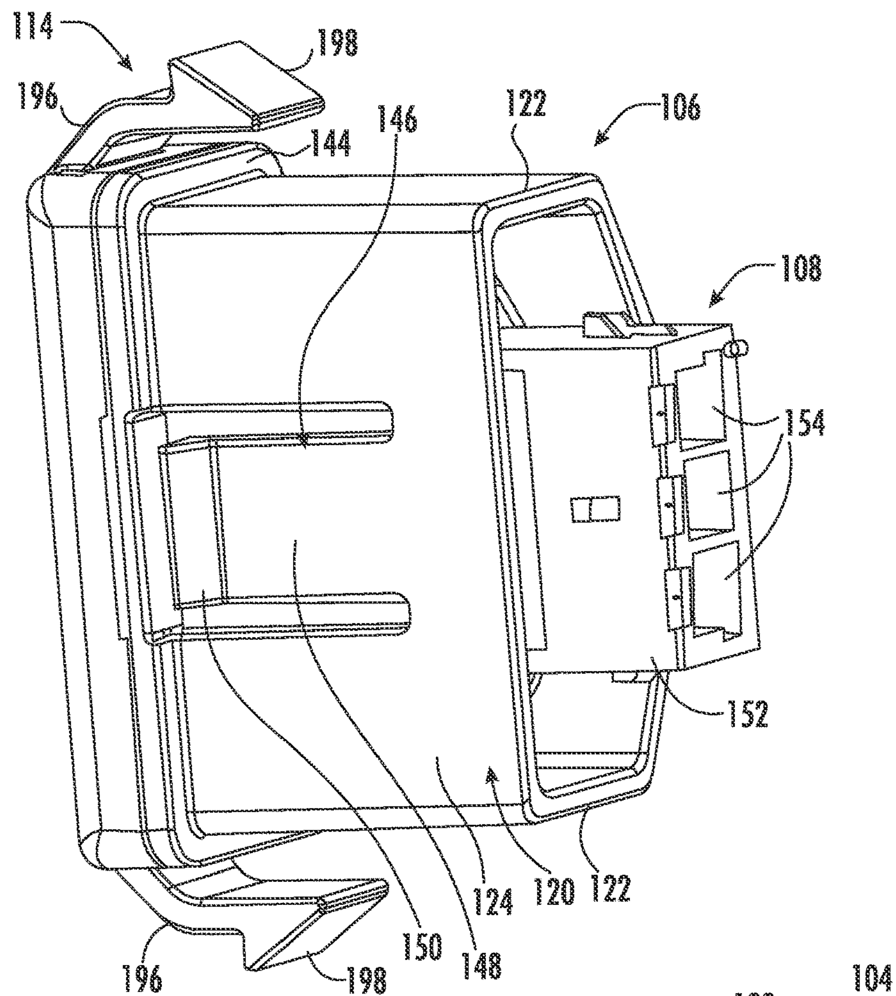
FIG. 3A illustrates a perspective view of the EOL bracket assembly in an assembled state without the side panel of the oven.
Figure 3B:
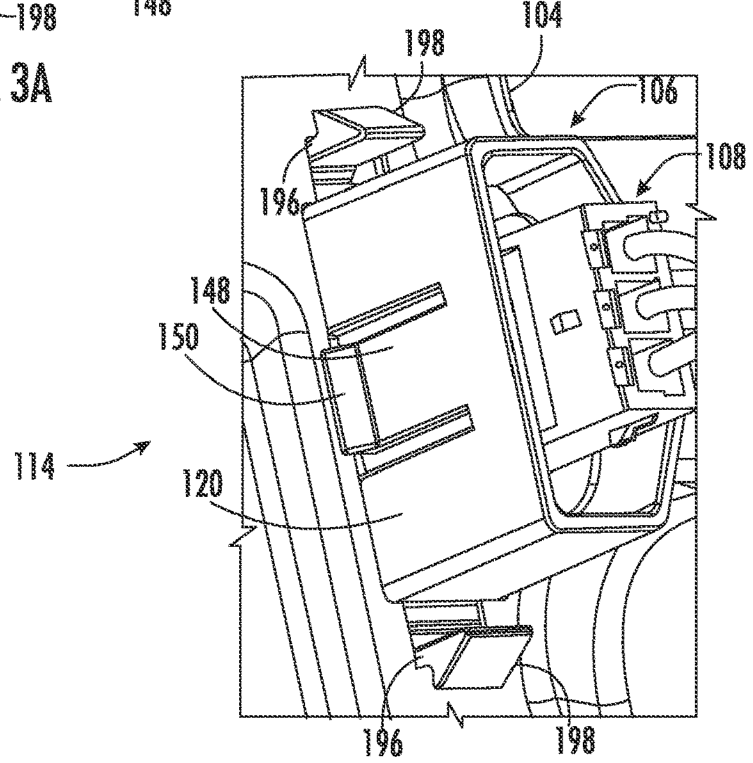
FIG. 3B illustrates a perspective view from inside the oven of the EOL bracket assembly installed to the side panel of the oven.

As best shown in FIGS. 3A-3B, each of the long sides 124, 126 of the EOL body 120 defines flexible latches 146 to allow the EOL body 120 to be secured to the side panel 104. The flexible latches 146 may each define a bendable latch body 148 formed into the respective sides 124, 126. The flexible latches 146 are attached to the EOL body 120 towards the interior end 130 and extend towards the exterior end 132 such that the latch body 148 is separated from the outer surface of the EOL body 120 on three sides. Each of the bendable latch bodies 148 defines angled snaps 150 formed towards the exterior end 132. The angled snaps 150 are configured to latch to the outer face 110 of the side panel 104 once the EOL bracket 106 is inserted into the side panel 104. The angled snaps 150 may define vertical surfaces that angle inwards towards the center of the EOL body 120 along the direction of travel of the EOL body 120 onto the side panel 104. The angled snaps 150 provide a surface for the bendable latch bodies 148 to ride as the EOL body 120 is slid into through hole 116 of the side panel 104. The two flexible latches 146 may accordingly flex toward one another as the EOL body 120 is slid into the through hole 116 and then resiliently flex back toward their original position once the angled snaps 150 pass beyond the through hole 116.

Thus, the side panel 104 may be secured within the gap defined between the inner flange face 144 of the EOL body 120 and the free ends of the angled snaps 150. To remove the EOL body 120 from the side panel 104, a user may simply press the angled snaps 150 inwards and push the EOL body 120 back out the through hole 116.

Figure 4:
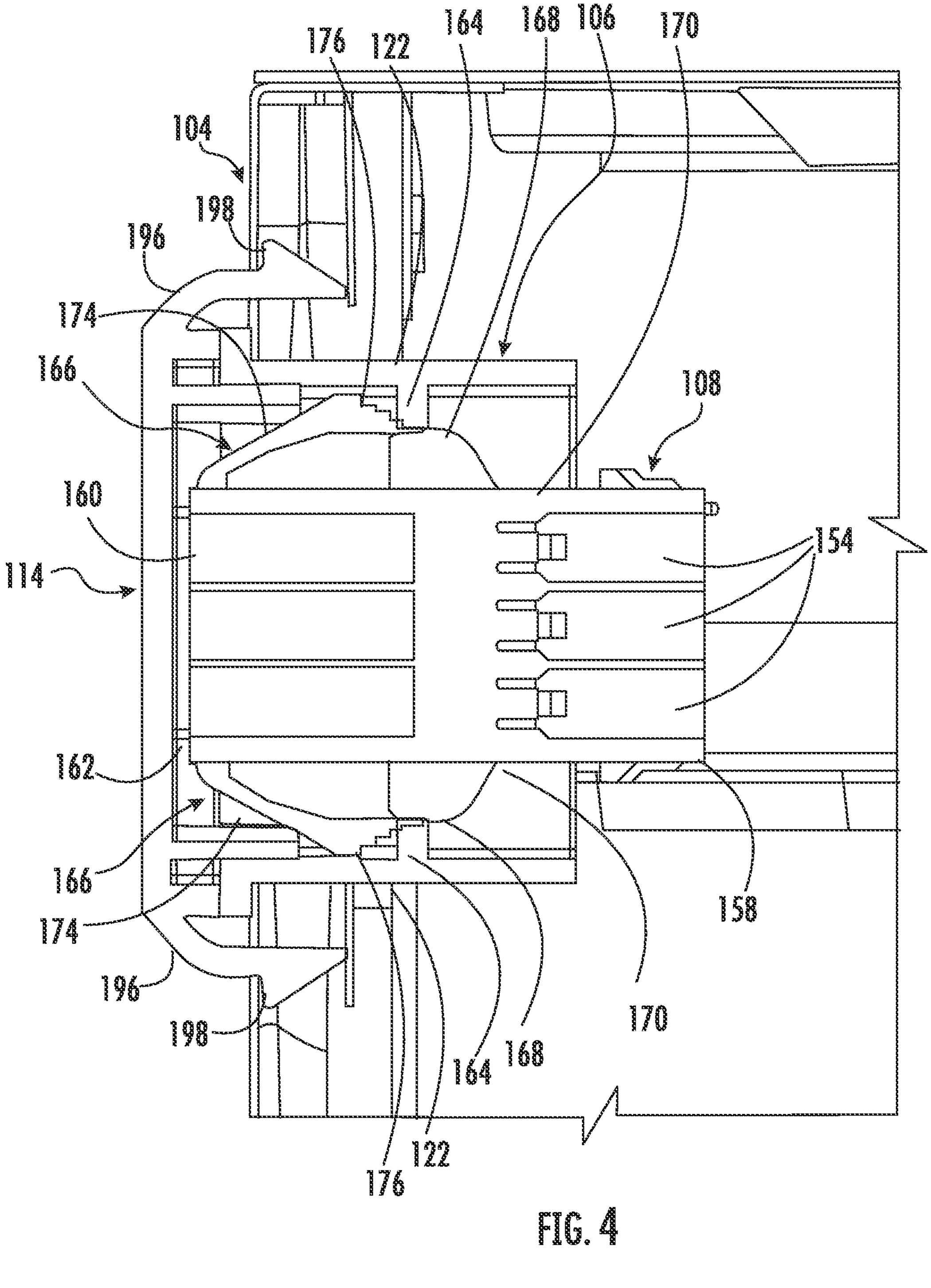
FIG. 4 illustrates a cross sectional view of the EOL bracket, the EOL plug, and the EOL cap installed to the side panel of the oven.
Figure 5A:
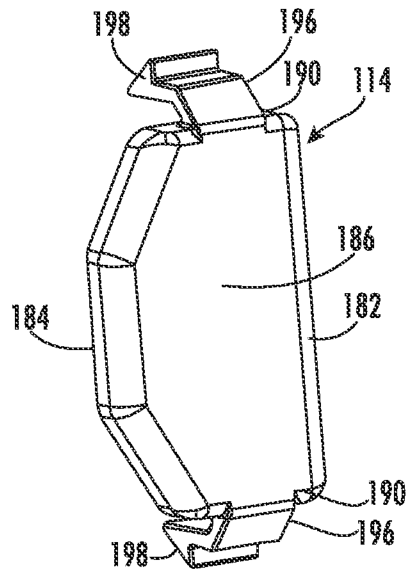
FIG. 5A illustrates a perspective view of the front of the EOL cap.
Figure 5B:
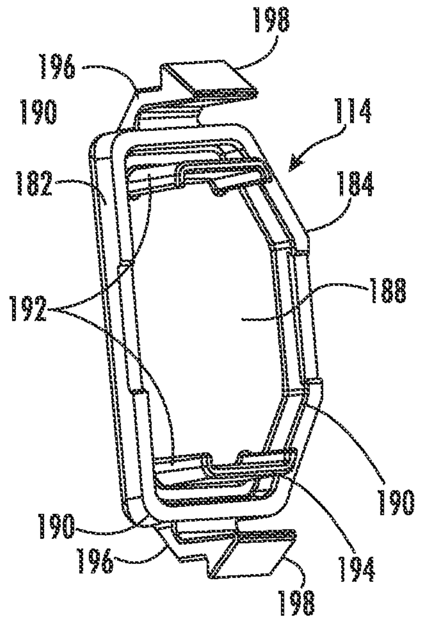
FIG. 5B illustrates a perspective view of the rear of the EOL cap.
Figure 5C:
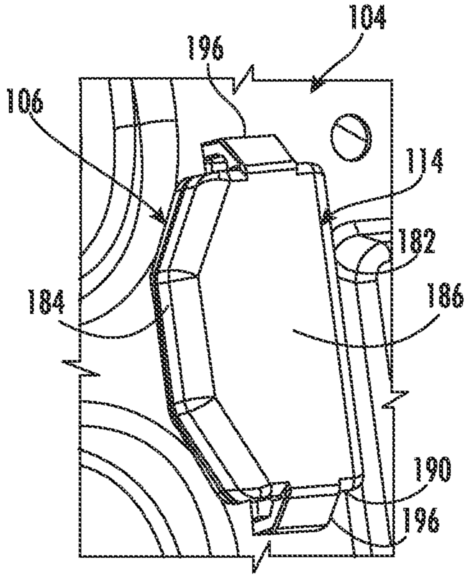
FIG. 5C illustrates a perspective view from outside the oven of the EOL bracket assembly installed to the side panel of the oven.
Figure 5D:
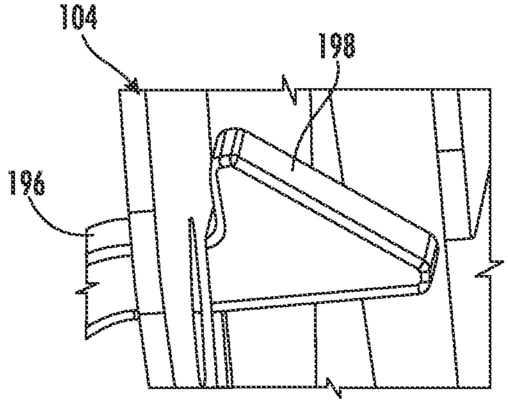
FIG. 5D illustrates a side view closeup of an locking snap of the EOL cap installed to the side panel.

Turning to the EOL plug 108, and as shown most clearly in FIG. 4, the EOL plug 108 may define a generally rectangular prism shaped plug body 152. The rectangular prism shaped plug body 152 may define an array of wire through holes 154 configured to receive a plurality of wires 156. For instance, as best seen in FIG. 2, the holes 154 may be configured to receive the wires 156 on an inner plug face 158 of the plug body 152 and provide an electrical connector 160 on an outer plug face 162 of the plug body 152 for attachment to an external power source. The wires 156 may include for example, hot, neutral, and ground for the powering of the electronics of the oven 100. As shown, the EOL plug 108 maintains the wires 156 in a linear array along the bulk of the plug body 152, but this is only an example, and more, fewer, or differently arranged wires 156 and electrical connectors 160 may be used.

The EOL bracket 106 and EOL plug 108 may further define features to allow for the EOL plug 108 to be received and secured into the EOL bracket 106. As best seen in FIG. 4, the EOL bracket 106 may define an interior detent 164 within the generally hollow area within the EOL bracket 106, while the EOL plug 108 may define mount latches 166 and stop walls 168. The interior detent 164 may be configured to receive and retain the EOL plug 108 between the mount latches 166 and the stop walls 168.

More specifically, the EOL plug 108 includes forwardly facing stop walls 168 extending rigidly outwardly from opposite plug side walls 170. The rearwardly directed mount latches 166 are deflectably and resiliently cantilevered from the same plug side walls 170. In particular, the mount latches 166 extend from portions of the plug side walls 170 generally adjacent to the outer plug face 162 and extend rearwardly until the stop walls 168 respectively. The mount latches 166 comprise forwardly facing ramped walls 174 and stepped rearwardly facing locking walls 176.

The stop walls 168 and the mount latches 166 are constructed to securely engage the EOL plug 108 inside the EOL bracket 106. In particular, the EOL plug 108 may be urged into the rear of the aperture 128 into the EOL bracket 106, causing the mount latches 166 to deflect inwardly around the interior detent 164 and then resiliently flex back toward their original position once the mount latches 166 pass beyond the interior detent 164. Sufficient movement of the EOL plug 108 into the EOL bracket 106 aperture 128 will cause the mount latches 166 to pass the interior detent 164, such that the interior detent 164 becomes engaged between the stop walls 168 and the stepped rearwardly facing locking walls 176. The particular portion of the stepped rearwardly facing locking walls 176 that engages the EOL bracket 106 may depend upon the specific dimensions of the interior detent 164. Thus, the EOL plug 108 holding the wires 156 may be inserted into and retained by the EOL bracket 106, which, in turn, may then be inserted into the side panel 104.

Turning to the EOL cap 114, as best shown in FIGS. 5A-5D, the EOL cap 114 comprises a cap body 178 sized to fully cover the body flange 134 of the EOL bracket 106. Thus, consistent with the design of the EOL bracket 106, the elongate cap body 178 is defined by two parallel short sides 180, a first long side 182, and a second asymmetric long side 184. As shown, the asymmetric long side 182 includes three faces, such that the sides 180, 182, 184 of the elongate cap body 178 collectively define a hex sized to cover the EOL bracket 106. The elongate cap body 178 may define an outer cap face 186 and an inner cap face 188 between the sides 180, 182, 184. The outer cap face 186 may define a flat smooth surface that covers the aperture 128 of the EOL bracket 106 when the EOL cap 114 is installed.

The inner cap face 188 may define a cap flange 190 along its perimeter extending inward from the inner cap face 188 and following the contour of the sides 180, 182, 184 of the EOL cap 114. When the EOL cap 114 is installed onto the EOL bracket 106, the cap flange 190 rests on the body flange 134, allowing the inner cap face 188 to be spaced apart from the EOL bracket 106. This distance may add clearance for the EOL cap 114 to clear the outer plug face 162 of the EOL plug 108 if the outer plug face 162 extends outwards past the exterior end 132 of the EOL body 120.

The EOL cap 114 may also include locators 192 extending inward from the inner cap face 188. The locator 192 may be positioned to case insertion inside the aperture 128 of the EOL bracket 106. As shown, the EOL cap 114 includes two locators 192, each spaced away from the cap flange 190 and each having an outer locator face 194 formed to fit the contour of the corresponding short side 184 of the aperture 128. By placing the locator 192 near the short sides 184, the locators 192 may allow the EOL cap 114 to slide into the aperture 128 without interference from the EOL bracket 106, as the mount latches 166 are the furthest away from the EOL cap 114 at that location.

The EOL cap 114 may further include locking snaps 196 along its width to allow the EOL cap 114 to snap into the cutout around the EOL bracket 106. As noted above, the through hole 116 in the side panel 104 includes cover gaps 142 along its short side edges 140 for receiving the locking snaps 196 of the EOL cap 114.

The locking snaps 196 are attached to the EOL cap 114 extending outwards and rearwards from each of the short sides 180. Each of the locking snaps 196 defines angled cap snaps 198 formed at a distal end of the respective locking snaps 196. The angled cap snaps 198 are configured to latch to the inner face 112 of the side panel 104 once the EOL cap 114 is inserted into the side panel 104. The angled cap snaps 198 may define vertical surfaces that angle inwards towards the center of the through hole 116 along the direction of travel of the EOL cap 114 onto the side panel 104. The angled cap snaps 198 provide a surface for the locking snaps 196 to ride against the cover gaps 142 of the side panel 104 as the locators 192 of the EOL cap 114 are slid into the aperture 128. The two locking snaps 196 may accordingly flex toward one another as the EOL cap 114 is slid into the through hole 116 and then resiliently flex back toward their original position once the locking snaps 196 pass beyond the through hole 116.

Thus, the EOL cap 114 is secured by the locking snaps 196 to the inner face 112 of the side panel 104 around the short side edges 140 of the EOL bracket 106. As a result, the EOL cap 114 may be snapped on top of the exterior of the EOL bracket 106 while the EOL bracket 106 is holding the EOL plug 108 in place. To remove the EOL cap 114 from the side panel 104, a user may simply press the locking snaps 196 inwards and pull the EOL cap 114 back out the through hole 116.

The EOL bracket 106, EOL cap 114, and EOL plug 108 may be assembled and mounted to the oven 100 without tools or screws. In an example, the EOL plug 108 may be snapped into the EOL bracket 106, and then the EOL bracket 106 may be snapped into the cutout. Once installed, the EOL cap 114 may be snapped in place over the installed EOL bracket 106. This provides the advantage that the EOL bracket 106, EOL cap 114, and EOL plug 108 can all be assembled and mounted to the oven 100 without tools or screws. Moreover, the compact size of the assembly allows more space for air louvers 118 which result in better thermal performance and heat dissipation.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as “a,” “the,” “said,” etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An end-of-line (EOL) bracket assembly for an appliance, comprising:

an EOL bracket including an EOL body forming a generally hollow prism shape, the EOL body defining a through aperture from an interior end of the EOL body to an exterior end of the EOL body; and an EOL plug configured to hold a plurality of wires for attachment to an external power source, wherein the EOL body defines a body flange extending outwards from the exterior end of the EOL body, the body flange being wider than a through hole defined by a panel of an appliance, such that the body flange mates against an outer surface of the panel when the EOL bracket is fully inserted into the through hole, wherein opposite sides of the EOL body define flexible latches having free ends with angled snaps for securing the EOL bracket between the body flange and the angled snaps when the interior end is inserted into the through hole, and wherein the EOL body further defines an interior detent for receiving and retaining the EOL plug when inserted into the interior end of the EOL body.

2. The EOL bracket assembly of claim 1, wherein the EOL plug is defined by stop walls extending rigidly outwards from opposite side walls of the EOL plug and mount latches extending flexibly outwards from the opposite side walls of the EOL plug, such that insertion of the EOL plug into the aperture of the EOL bracket allows the mount latches to deflect inwardly around the interior detent and then resiliently flex back toward their original position once the mount latches pass beyond the interior detent, causing the interior detent to become engaged between the stop walls and the mount latches.

3. The EOL bracket assembly of claim 1, wherein the flexible latches define bendable latch bodies attached to the EOL body towards the interior end of the EOL bracket and separated from the outer surface of the EOL body on three other sides to form the free ends.

4. The EOL bracket assembly of claim 3, wherein insertion of the EOL bracket into the through hole of the panel allows the latch bodies to deflect inwardly around the panel and then resiliently flex back toward their original position once the latch bodies pass beyond the panel, such that the angled snaps engage the panel.

5. The EOL bracket assembly of claim 1, wherein the EOL body is asymmetrical such that the EOL body is insertable into the through hole in a single orientation.

6. The EOL bracket assembly of claim 5, wherein the EOL body is defined by two parallel short sides, a first long side, and a second, asymmetric long side.

7. The EOL bracket assembly of claim 1, further comprising an EOL cap defining a cap body sized to cover the EOL bracket, the EOL cap defining locking snaps along its width to allow the EOL cap to snap into cutouts of the through hole around the EOL bracket.

8. The EOL bracket assembly of claim 7, wherein the EOL cap includes a cap flange along its perimeter extending downwards from an inner cap face of the cap body, allowing the inner cap face to be spaced apart from the EOL bracket to add clearance for the EOL cap to clear the EOL plug.

9. The EOL bracket assembly of claim 8, wherein the EOL cap includes one or more locators each spaced away from the cap flange and defining an outer locator face to fit a contour of the aperture and allow the EOL cap to slide into the aperture without interference from the EOL bracket.

10. An EOL bracket assembly for an appliance, comprising:

an EOL plug configured to hold a plurality of wires for attachment to an external power source;

an EOL bracket including an EOL body defining a through aperture, the through aperture including an interior detent for receiving and retaining the EOL plug, and flexible latches for securing the EOL bracket into a through hole defined by a panel of the appliance; and an EOL cap including a cap body sized to cover the EOL bracket when installed into the panel, the EOL cap having locking snaps for securing the EOL cap into cutouts of the through hole around the EOL bracket, wherein the EOL plug defines stop walls extending rigidly outwards from opposite side walls of the EOL plug and mount latches extending flexibly outwards from the opposite side walls of the EOL plug, such that insertion of the EOL plug into the aperture of the EOL bracket allows the mount latches to deflect inwardly around the interior detent and then resiliently flex back toward their original position once the mount latches pass beyond the interior detent, causing the interior detent to become engaged between the stop walls and the mount latches.

11. The EOL bracket assembly of claim 10, wherein the EOL bracket includes a body flange extending outwards from the exterior end of the EOL body, the flange being wider than the through hole, such that the body flange mates against the outer surface of the panel when the EOL bracket is fully inserted into the through hole.

12. The EOL bracket assembly of claim 11, wherein opposite sides of the EOL body include the flexible latches as bendable latch bodies attached to the EOL body towards the interior end and separated from the outer surface of the EOL body on three other sides to form free ends.

13. The EOL bracket assembly of claim 12, wherein the free ends include snaps such that insertion of the EOL bracket into the through hole of the panel allows the latch bodies to deflect inwardly around the panel and then resiliently flex back toward their original position once the latch bodies pass beyond the panel, thereby securing the panel within a gap defined between the flange of the EOL body and the free ends of the flexible latches.

14. The EOL bracket assembly of claim 10, wherein the EOL body is asymmetrical such that the EOL body is insertable into the through hole in a single orientation.

15. The EOL bracket assembly of claim 10, the EOL cap includes locking snaps along its width to allow the EOL cap to snap into cutouts of the through hole around the EOL bracket.

16. The EOL bracket assembly of claim 10, wherein the EOL cap includes a cap flange along its perimeter extending downwards from an inner cap face of the body, allowing the inner cap face to be spaced apart from the EOL bracket to add clearance for the EOL cap to clear the EOL plug.

17. The EOL bracket assembly of claim 16, wherein the EOL cap includes one or more locators each spaced away from the cap flange and defining an outer locator face to fit a contour of the aperture and allow the EOL cap to slide into the aperture without interference from the EOL bracket.

18. A method for assembling an EOL bracket assembly for an appliance, comprising:

inserting an EOL bracket into a through hole defined by a panel of an appliance from an exterior side of the panel, the EOL bracket having an EOL body defining a through aperture from an interior end of the EOL body to an exterior end of the EOL body and a body flange extending outwards from the exterior end of the EOL body, the body flange being wider than the through hole such that the body flange mates against an outer surface of the panel when the EOL bracket is fully inserted into the through hole, and wherein opposite sides of the EOL body define flexible latches having free ends with angled snaps that secure the EOL bracket between the body flange and the angled snaps;

inserting an EOL plug into an interior end of the through aperture to secure the EOL plug into the EOL bracket by engaging an interior detent defined by the EOL body to receive and retain the EOL plug; and installing an EOL cap into the through hole of the panel from the exterior side, over the EOL bracket and the EOL plug as assembled to the panel by snapping locking snaps of the EOL cap into cutouts of the through hole around the EOL bracket.

* * * * *